United States Patent
Srivastava et al.

(10) Patent No.: US 11,438,639 B2
(45) Date of Patent: Sep. 6, 2022

(54) PARTIAL-VIDEO NEAR-DUPLICATE DETECTION

(71) Applicant: Microsoft Technology Licensing, LLC, Redmond, WA (US)

(72) Inventors: Sumit Srivastava, Bangalore (IN); Suhit Sinha, Bangalore (IN); Ananth Sankar, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 16/807,961

(22) Filed: Mar. 3, 2020

(65) Prior Publication Data
US 2021/0281891 A1  Sep. 9, 2021

(51) Int. Cl.
| | |
|---|---|
| *H04N 21/234* | (2011.01) |
| *G06F 17/16* | (2006.01) |
| *G06N 7/00* | (2006.01) |
| *G06N 20/00* | (2019.01) |
| *G06F 16/732* | (2019.01) |

(52) U.S. Cl.
CPC ... *H04N 21/23418* (2013.01); *G06F 16/7328* (2019.01); *G06F 17/16* (2013.01); *G06N 7/005* (2013.01); *G06N 20/00* (2019.01)

(58) Field of Classification Search
CPC ........ G06N 7/005; G06N 20/00; G06F 17/16; G06F 16/7328; H04N 21/23418
See application file for complete search history.

(56) References Cited

U.S. PATENT DOCUMENTS

| | | | | |
|---|---|---|---|---|
| 8,189,945 B2* | 5/2012 | Stojancic | ............ | G06F 16/7847 382/154 |
| 9,652,672 B2* | 5/2017 | Stojancic | ............ | G06F 16/7847 |
| 10,034,066 B2* | 7/2018 | Tran | ..................... | A63F 13/5255 |
| 10,346,949 B1* | 7/2019 | Raitarovskyi | ........ | G06V 10/751 |
| 11,126,650 B2* | 9/2021 | Stojancic | .............. | G06F 16/783 |
| 11,282,291 B1* | 3/2022 | Boardman | .............. | G06T 19/20 |

(Continued)

OTHER PUBLICATIONS

Cai, et al., "Million-Scale Near-Duplicate Video Retrieval System", In Proceedings of the 19th ACM International Conference on Multimedia, Nov. 28, 2011, 2 Pages.

(Continued)

*Primary Examiner* — Mia M Thomas
(74) *Attorney, Agent, or Firm* — Schwegman Lundberg & Woessner, P.A.

(57) ABSTRACT

Methods, systems, and computer programs are presented for detecting near duplicates and partial matches of videos. One method includes an operation for receiving a video containing frames. For each frame, keypoints are determined within the frame. For each keypoint, a horizontal gradient vector is calculated based on a horizontal gradient at the keypoint and a vertical gradient vector is calculated based on a vertical gradient at the keypoint. The horizontal and vertical gradients are binary vectors. Further, a keypoint description is generated for each keypoint based on the horizontal gradient vector and the vertical gradient vector. Further, the frames are matched to frames of videos in a video library based on the keypoint descriptions of the keypoints in the frame in the videos in the video library. Further, a determination is made if the video has near duplicates in the video library based on the matching.

20 Claims, 10 Drawing Sheets

(56) References Cited

U.S. PATENT DOCUMENTS

| | | | | |
|---|---|---|---|---|
| 2013/0101032 A1* | 4/2013 | Wittmann | .............. | H04N 19/82 |
| | | | | 375/240.12 |
| 2014/0328570 A1* | 11/2014 | Cheng | .................. | H04N 21/233 |
| | | | | 386/241 |
| 2019/0026489 A1* | 1/2019 | Nerurkar | ................. | G06N 20/00 |
| 2020/0110926 A1* | 4/2020 | Csillag | .................... | G06F 17/15 |
| 2021/0089761 A1* | 3/2021 | Tyomkin | ................ | G06V 20/46 |
| 2021/0142052 A1* | 5/2021 | James | .................... | G06V 40/10 |
| 2022/0066456 A1* | 3/2022 | Ebrahimi Afrouzi | ..... | A47L 9/30 |

OTHER PUBLICATIONS

Calonder, et al., "BRIEF: Binary Robust Independent Elementary Features", In Proceedings of the 11th European Conference on Computer Vision: Part IV, Sep. 5, 2010, 14 Pages.

Jiang, et al., "VCDB: A Large-Scale Database for Partial Copy Detection in Videos", In Proceedings of the European Conference on Computer Vision, Sep. 6, 2014, pp. 1-14.

Kordopatis-Zilos, et al., "Near-Duplicate Video Retrieval with Deep Metric Learning", In Proceedings of the IEEE International Conference on Computer Vision, Oct. 22, 2017, pp. 347-356.

Leutenegger, et al., "BRISK: Binary Robust Invariant Scalable Keypoints", In Proceedings of IEEE International Conference on Computer Vision, Nov. 6, 2011, pp. 1-8.

Rublee, et al., "ORB: An Efficient Alternative to SIFT or SURF", In Proceeding of IEEE International Conference on Computer Vision, Nov. 6, 2011, 8 Pages.

* cited by examiner

PARTIAL-VIDEO NEAR-DUPLICATE DETECTION

TECHNICAL FIELD

The subject matter disclosed herein generally relates to methods, systems, and machine-readable storage media for detecting video duplicates.

BACKGROUND

Detecting video duplicates is desired in multiple occasions, such as when a user submits a video to an online service or when a user is searching for related videos. The online service wishes to detect duplicate videos in order to avoid repetition, eliminate spam, detect low-quality videos, protect copyright, etc. The detection of video duplicates may include detecting exact matches of videos, as well as detecting near duplicates, which include videos that are not exact copies but that are derived from another video, such as by clipping the original video or making alterations to the original video (e.g., changing the brightness, adding a logo, blurring the image).

In a large system, such as an online service with hundreds of millions of users, the number of videos available is very large and continuously growing. Detecting video duplicates in these large systems is a complex problem, and algorithms exist to detect exact copies of videos. However, detecting near duplicates is more complex as the near duplicates may have a different number of frames, frames that have been altered, additions to the original video, etc.

What is needed is a video near-duplicate detection that can operate in a large-scale system to detect near duplicates from a large library of videos and the detection be performed very quickly.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to detecting near duplicates and partial matches of videos. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments are presented for detection of video near duplicates in a large corpus able to detect the near duplicates under presence of photometric distortions, such as video clipping and video modifications. A method for video fingerprinting is presented that is robust against heavy distortion and is able to quickly detect the near duplicates within a large corpus of videos. The proposed method is scalable to work with large datasets and in presence of severe distortions of the videos. The fingerprinting methods identify keypoints in video frames and creates fingerprints based on the pixel gradients at the keypoints. To detect duplicates in near duplicates, the method compares the fingerprints to the fingerprints of videos in a video library. Since the fingerprints are binary, detecting for duplicates and near duplicates is fast and efficient.

One method includes an operation for receiving a video containing frames. For each frame, keypoints are determined within the frame. For each keypoint, a horizontal gradient vector is calculated based on a horizontal gradient at the keypoint and a vertical gradient vector is calculated based on a vertical gradient at the keypoint. The horizontal and vertical gradients are binary vectors. Further, a keypoint description is generated for each keypoint based on the horizontal gradient vector and the vertical gradient vector. Further, the frames are matched to frames of videos in a video library based on the keypoint descriptions of the keypoints in the frame in the videos in the video library. Further, a determination is made if the video has near duplicates in the video library based on the matching.

Figure 1:
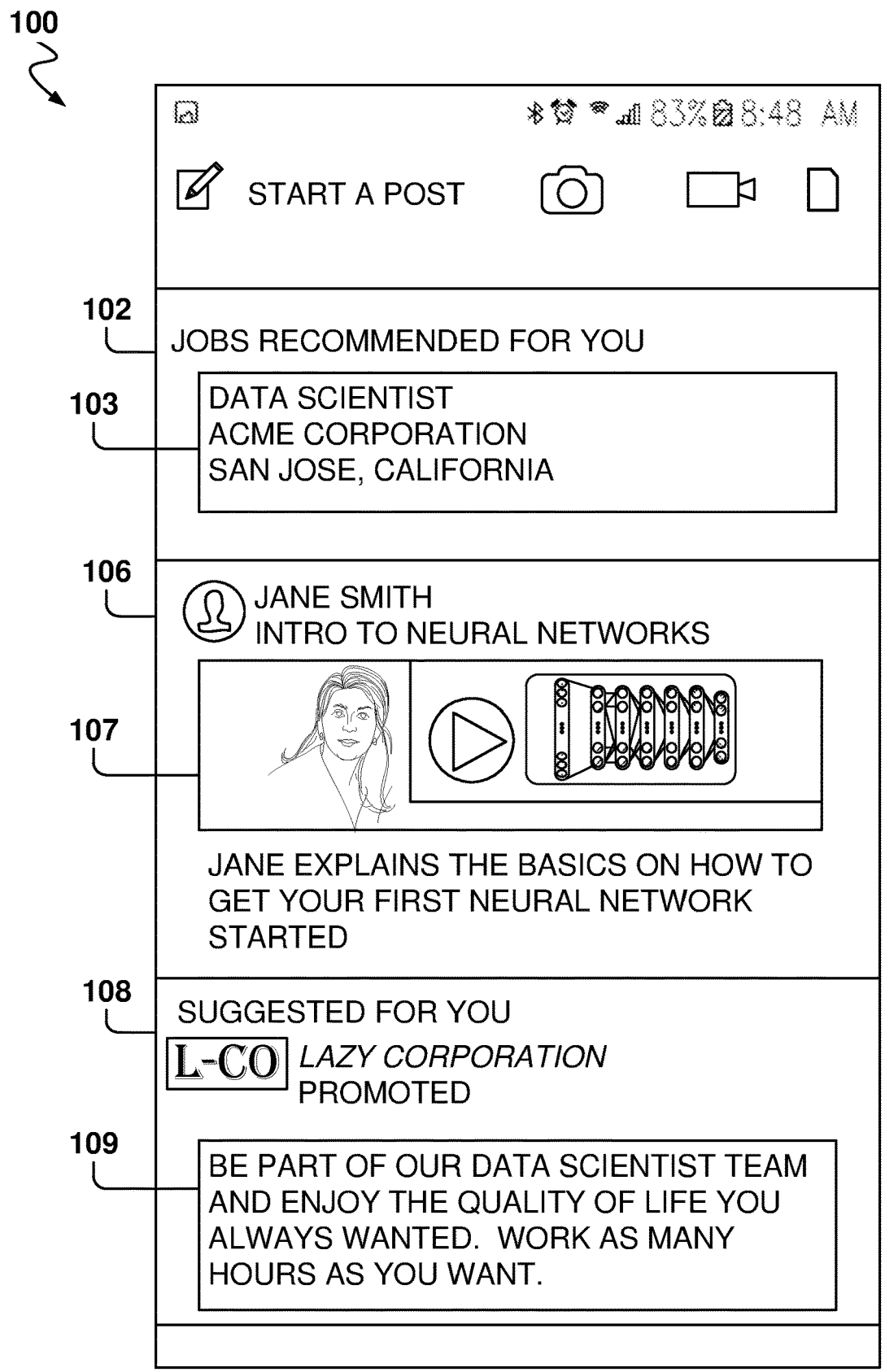
FIG. 1 is a screenshot of a user feed, according to some example embodiments.

FIG. 1 is a screenshot of a user feed that includes items in different categories, according to some example embodiments. In the example embodiment of FIG. 1, the user feed 100 includes different categories, such as job recommendations 102, user posts 106, and sponsored items 108; other embodiments may include additional categories such as news, messages, articles, etc.

The user posts 106 include item 107 posted by users of the social network service (e.g., items posted by connections of the user), and may be videos, comments made on the social network, pointers to interesting articles or webpages, etc. In the illustrated example, the item 107 includes a video submitted by a user.

In one example embodiment, a social network service user interface provides the job recommendations 102 (e.g., job posts 103 and 109) that match the job interests of the user and that are presented without a specific job search request from the user, referred to herein as "jobs you may be interested in" (JYMBII).

Although the categories are shown as separated within the user feed 100, the items from the different categories may be intermixed, and not just be presented as a block. Thus, the user feed 100 may include a large number of items from each of the categories, and the social network decides the order in which these items are presented to the user based on the desired utilities. Additionally, the user may receive in-network communications from other users. The communications may originate by other users who are socially connected with the user or by unconnected users.

Figure 2:
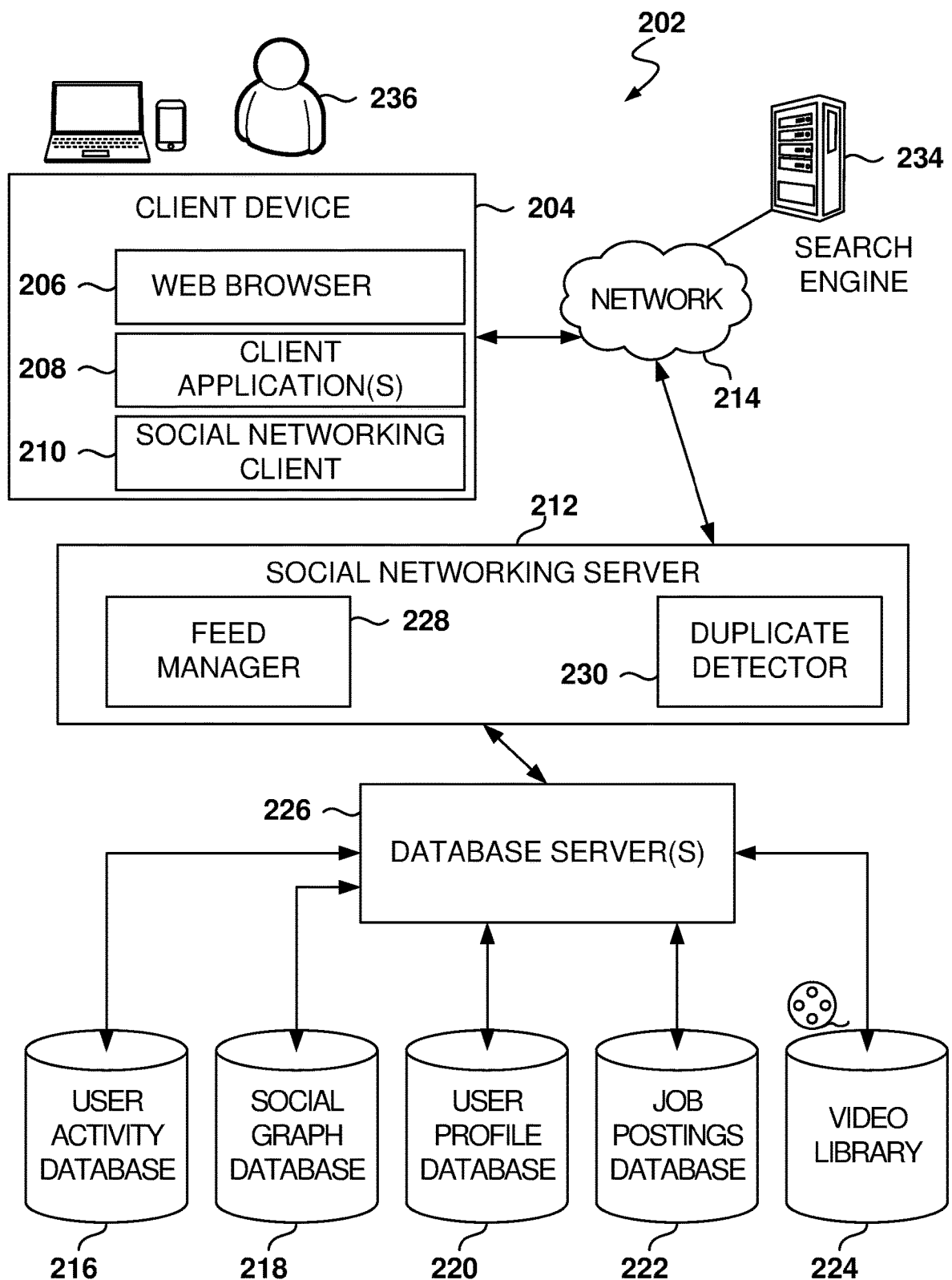
FIG. 2 is a block diagram illustrating a networked system, according to some example embodiments, including a social networking server, illustrating an example embodiment of a high-level client-server-based network architecture.

FIG. 2 is a block diagram illustrating a networked system, according to some example embodiments, including a social networking server 212, illustrating an example embodiment of a high-level client-server-based network architecture 202. Embodiments are presented with reference to an online service and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a web browser 206, client application(s) 208, and a social networking client 210 executing on a client device 204. The social networking server 212 is further communicatively coupled with one or more database servers 226 that provide access to one or more databases 216-224.

The social networking server 212 includes, among other modules, a feed manager 228 and a duplicate detector 230. The feed manager 228 creates and presents the user feed to the user 236, and the duplicate detector 230 detects duplicates and near-duplicate videos. For simplicity of description, embodiments are presented for the detection of duplicates and near duplicates and the embodiments are described for detecting near duplicates (also referred to herein as partial duplicates), but the same methods are also available for detection of exact video duplicates.

The client device 204 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 236 may utilize to access the social networking server 212. In some embodiments, the client device 204 may comprise a display module (not shown) to display information (e.g., in the form of user interfaces).

In one embodiment, the social networking server 212 is a network-based appliance that responds to initialization requests or search queries from the client device 204. One or more users 236 may be a person, a machine, or other means of interacting with the client device 204. In various embodiments, the user 236 interacts with the network architecture 202 via the client device 204 or another means.

The client device 204 may include one or more applications (also referred to as "apps") such as, but not limited to, the web browser 206, the social networking client 210, and other client applications 208, such as a messaging application, an electronic mail (email) application, a news application, and the like. In some embodiments, if the social networking client 210 is present in the client device 204, then the social networking client 210 is configured to locally provide the user interface for the application and to communicate with the social networking server 212, on an as-needed basis, for data and/or processing capabilities not locally available (e.g., to access a user profile, to authenticate a user 236, to identify or locate other connected users 236, etc.). Conversely, if the social networking client 210 is not included in the client device 204, the client device 204 may use the web browser 206 to access the social networking server 212.

In addition to the client device 204, the social networking server 212 communicates with the one or more database servers 226 and databases 216-224. In one example embodiment, the social networking server 212 is communicatively coupled to a user activity database 216, a social graph database 218, a user profile database 220, a job postings database 222, and a video library 224. The databases 216-224 may be implemented as one or more types of databases including, but not limited to, a hierarchical database, a relational database, an object-oriented database, one or more flat files, or combinations thereof.

The user profile database 220 stores user profile information about users 236 who have registered with the social networking server 212. With regard to the user profile database 220, the user 236 may be an individual person or an organization, such as a company, a corporation, a non-profit organization, an educational institution, or other such organizations.

In some example embodiments, when a user 236 initially registers to become a user 236 of the social networking service provided by the social networking server 212, the user 236 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 220. Similarly, when a representative of an organization initially registers the organization with the social networking service provided by the social networking server 212, the representative may be prompted to provide certain information about the organization, such as a company industry.

As users 236 interact with the social networking service provided by the social networking server 212, the social networking server 212 is configured to monitor these interactions. Examples of interactions include, but are not limited to, commenting on posts entered by other users 236, viewing user profiles, editing or viewing a user 236's own profile, sharing content outside of the social networking service (e.g., an article provided by an entity other than the social networking server 212), updating a current status, posting content for other users 236 to view and comment on, posting job suggestions for the users 236, searching job postings, and other such interactions. In one embodiment, records of these interactions are stored in the user activity database 216, which associates interactions made by a user 236 with his or her user profile stored in the user profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

The video library 224 includes videos uploaded to the social networking service, such as videos uploaded by users. In other example embodiments, the video library 224 may also include other videos, such as videos downloaded from websites, news, other social networking services, etc. Embodiments presented herein are described with reference to videos uploaded by users of the social networking service, the same principles may be applied for other types of videos.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine.

Figure 3:
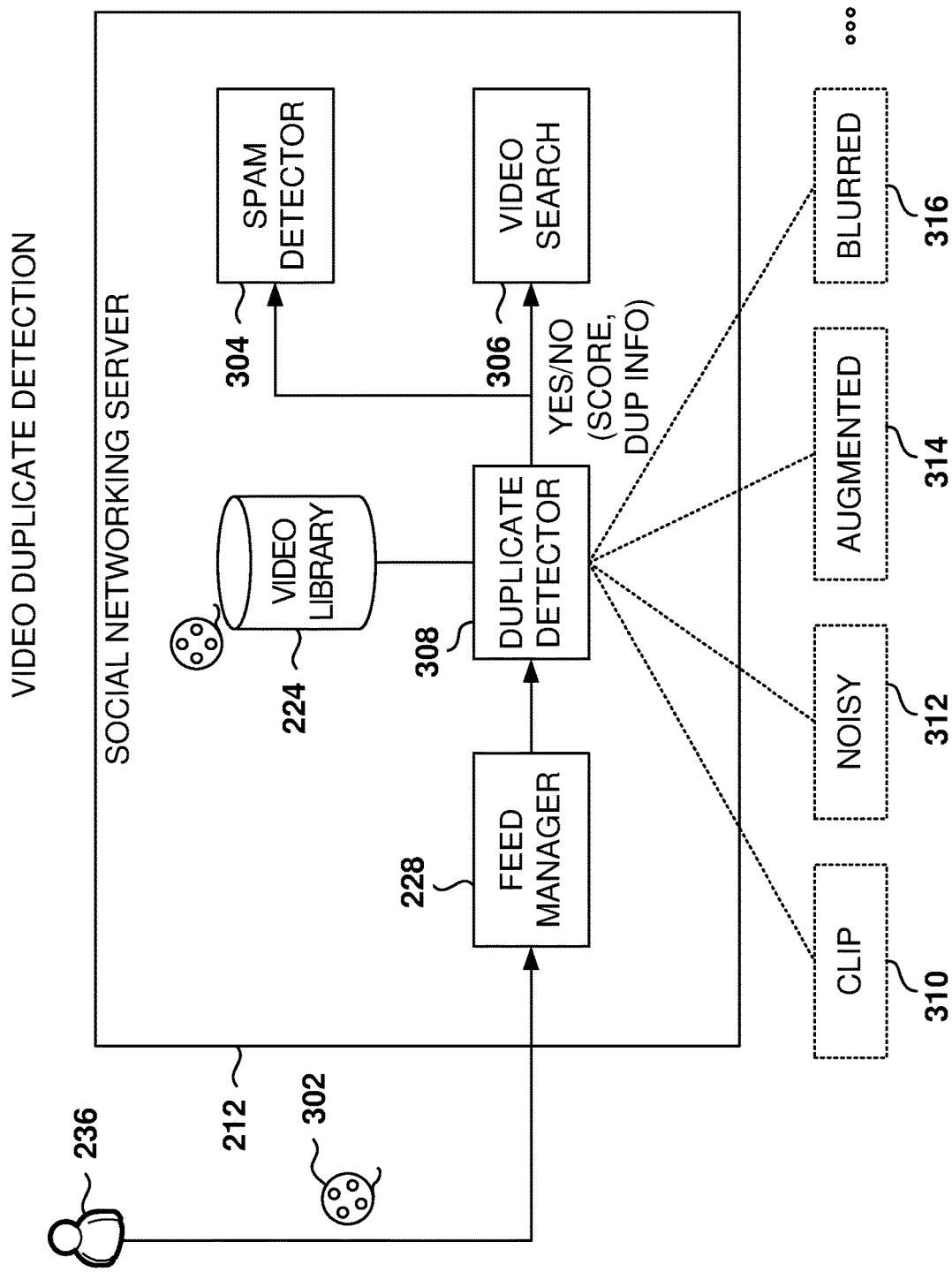
FIG. 3 illustrates the process for detection of video duplicates and near duplicates, according to some example embodiments.

FIG. 3 illustrates the process for detection of video duplicates and near duplicates, according to some example embodiments. When the user 236 submits a video 302 to the social networking service (e.g., a video to be added to the user's feed), the feed manager 228 receives the video and interacts with duplicate detector 308 to determine if the video 302 is a near duplicate.

The near duplicates may generated when the video 302 is clipped 310 (e.g., only a subset of frames of the original video are submitted), noisy 312 (e.g., the original video is blurred), augmented 314 (e.g., by adding text, logos, graphics), blurred 316, etc.

The duplicate detector 308 checks the submitted video 302 against the videos previously submitted and stored in the video library 224. The duplicate detector 308 then provides an answer to the question if the submitted video 302 is a near duplicate, such as indicating if the video is a near duplicate, or by providing a score indicating the probability that the video 302 is a near duplicate. Additionally, the duplicate detector 308 may provide additional information such as the identity of the video in the library that is a near duplicate of the submitted video 302.

The results provided by the duplicate detector 308 may be utilized by other applications, such as the spam detector 304 and a video search utility 306 that searches for videos that are similar to a given video, such as the video 302 or a video from the video library 224.

Figure 4:
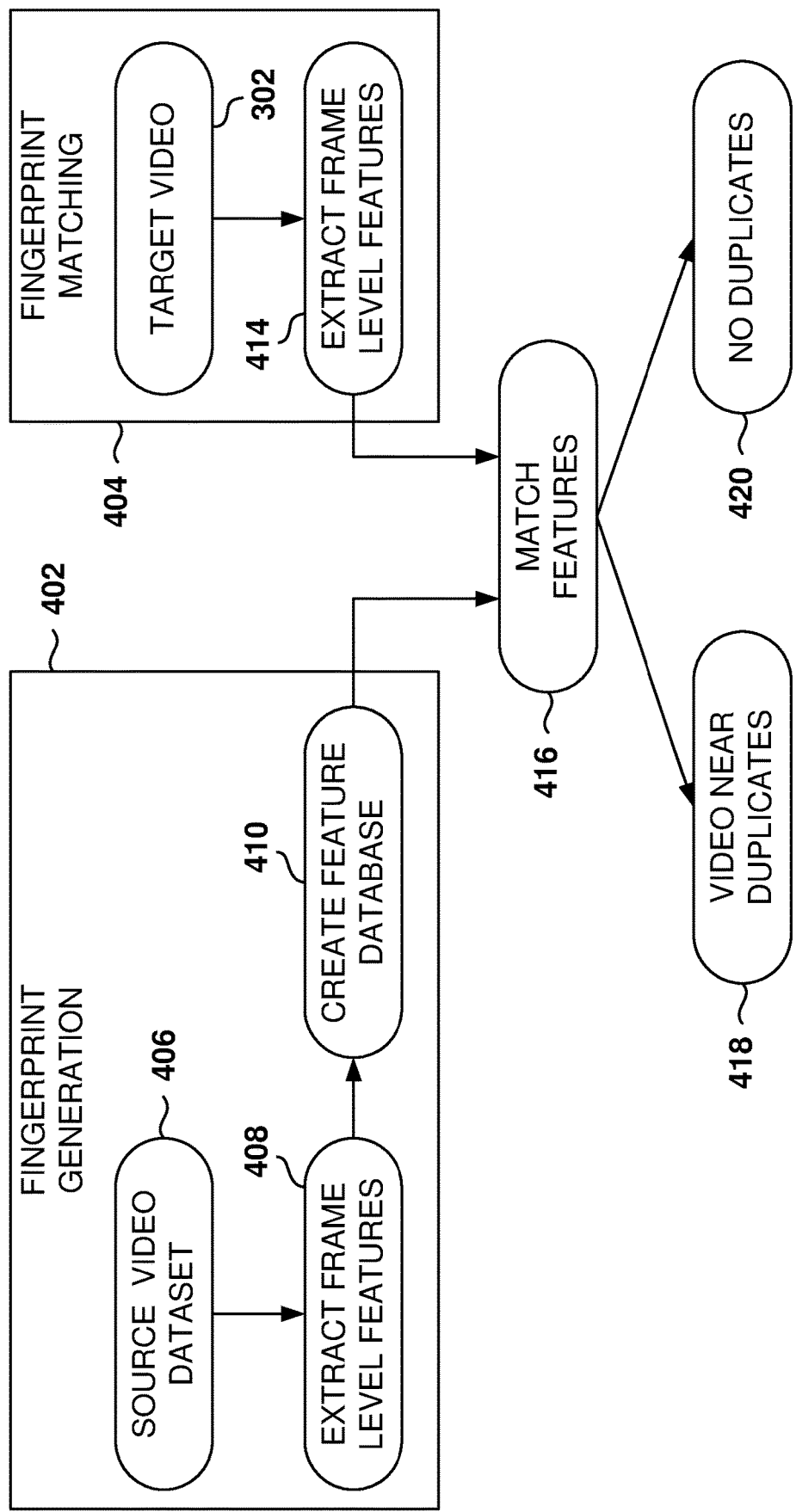
FIG. 4 details the process for video near-duplicate detection, according to some example embodiments.

FIG. 4 details the process for video near-duplicate detection, according to some example embodiments. The partial-copy detection procedure is separated into two parts: video fingerprint generation 402 and video fingerprint matching 404.

Video fingerprint generation 402 includes analyzing a source video data set 406 (e.g., video library 224 of FIGS. 2 and 3) to extract frame-level features 408 to represent each of the videos. In some example embodiments, the source video data set 406 includes videos submitted by users of the online service for posting on the user feed.

In some example embodiments, the frame-level features include fingerprints for the frames of the videos. The fingerprints provide a robust representation of the video frames that is able to withstand changes to the videos, such as contrast change, brightness change, noise addition, etc. The extracted frame level features are stored in a feature database 410, such as video library 224.

Fingerprint matching 404 is performed for the target video 302. The frame level features of the video 302 are extracted at operation frame-level features 414 in the same fashion as in operation frame-level features 408 to generate the corresponding fingerprints for the video frames in the video 302. More details about generating fingerprints are provided below with reference to FIGS. 5-7.

At operation 416, the features of the video 302 are compared against the feature database to determine if there is a match indicating a near duplicate. The result of the matching is one or more video duplicates 418, if such duplicates exist, or no duplicates 420 if no duplicates are found.

Figure 5:
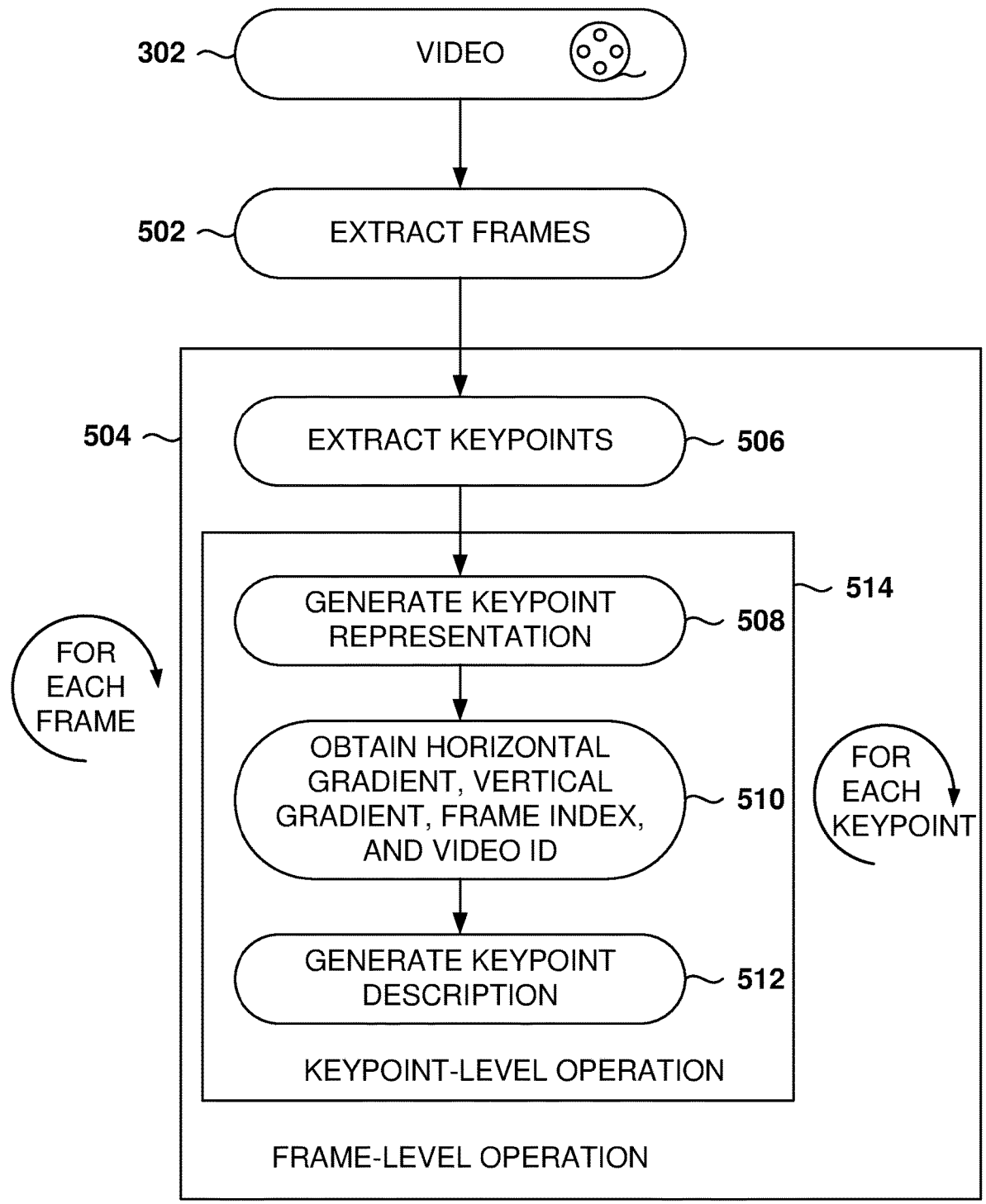
FIG. 5 is a flowchart of a method for obtaining the keypoint description of the frames within a video, according to some example embodiments.

FIG. 5 is a flowchart of a method for obtaining the keypoint description of the frames within a video, according to some example embodiments. The task of partial-video-copy detection utilizes frame-level information extraction and representation. Since each frame can be subjected to various distortions it is useful to look for local features that are invariant to such application of such distortions.

At operation 502, the frames from video 302 are extracted, and operation 504 is performed for each frame to obtain a description of the frame that includes descriptions for one or more keypoints in the frame. Process 514 is performed for each of the keypoints to generate the keypoint description 512.

In general, keypoints are points in the image that define what is interesting or what stands out in the image. Keypoints are invariant to image rotation, shrinkage, translation, distortion, and so on. In some example embodiments, a keypoint is a point that has significant gradient change, when compared to neighbor points, in the horizontal and vertical directions.

An image gradient is a directional change in the intensity or color in an image. The gradient of a point refers to the rage of change of the values of the pixels around the point. The gradient of the image is used in image processing. For example, the Canny edge detector uses image gradient for edge detection. In graphics software for digital image editing, the term gradient or color gradient is also used for a gradual blend of color which can be considered as an even gradation from low to high values.

Mathematically, the gradient of a two-variable function (e.g., the image intensity function) at each image point is a two-dimensional vector with the components given by the derivatives in the horizontal and vertical directions. At each image point, the gradient vector points in the direction of largest possible intensity increase, and the length of the gradient vector corresponds to the rate of change in that direction.

Image gradients can be used to extract information from images. Gradient images are created from the original image (generally by convolving with a filter, such as the Sobel filter). Each pixel of a gradient image measures the change in intensity of that same point in the original image, in a given direction. To get the full range of direction, gradient images in the horizontal and vertical directions are computed. The gradient may be calculated for a group of points inside a square centered around the keypoint. A matrix of values is then used for the pixel values of the points within the square. The size of the matrix may vary, such as 3×3, 4×4, 5×5, 10×10, etc.

Gradient changes may be used in edge detection. After gradient images have been computed, pixels with large gradient values become possible edge pixels. The pixels with the largest gradient values in the direction of the gradient become edge pixels, and edges may be traced in the direction perpendicular to the gradient direction. One example of an edge detection algorithm that uses gradients is the Canny edge detector. Further, corner points may be identified by finding points where two edges intersect.

In some example embodiments, keypoint descriptions are extracted for all the frames in the video, but in other example embodiments, a subset of the frames are used to extract keypoint. Since consecutive frames tend to be similar, some of the frames can be skipped, such as every other frame, or selecting one out of every fifth frame, etc. In order example embodiments, the most significant frames are selected, which are those frames that have more distinct information, such as a large number of different keypoints. Frames with a small number of keyframes may be omitted from storage in the database.

At operation 506, the keypoints are extracted from the frame. Any keypoint-extraction algorithm may be used, such as BRISK (Binary Robust Invariant Scalable Keypoints) or ORB (An efficient alternative to SIFT or SURF). The result is a list of keypoints in the video frame and data corresponding to the keypoints.

Within a video, a point in the sky is very similar to any other point in the sky; therefore, points in the sky are not keypoints. Further, along an edge of a shape can be matched to other points along the same edge then you can match it to any other point that is present along the edge. Thus, the edge point provides more information than the point in the sky but the point on the edge is not a keypoint. However, a point in the image where the gradient is significant along two different directions (e.g., corners) are significant because of their uniqueness. These types of points are good keypoints.

One feature of a corner point is that the corner point has significant amount of gradient change in two distinct directions. These corners are generally localizable even after photometric distortions have been applied to the video frame. Thus, corner points are much more robust than a point in the sky or a point along an edge. The gradient change being significant means that the difference of values in the pixels is significant, such as above a predetermined threshold.

The number of keypoints extracted from the frame depends on the amount of robustness of the algorithm desired and the robustness is a configurable parameter. Therefore, the number of keypoints extracted will vary. Typically, the number of keypoints extracted for a typical image will be in the hundreds, but the number could be smaller or higher depending on the configuration and the degree of variation within the frame.

In some example embodiments, the number of keypoint extracted may be kept to a maximum per frame in order to avoid growing the database to large. For example, the number of keypoints extracted may be capped to 200. If more keypoints are available, the 200 most significant keypoints will be saved.

At operation 508, a keypoint representation is generated. For example, the keypoint can then be described using algorithms like BRIEF (Binary Robust Independent Elementary Features) and ORB, but other representations may also be utilized. In some example embodiments, the keypoint representation is a binary vector with a 256 dimension. Other embodiments may include binary representations with vectors of smaller dimension (e.g., 64, 100, 128) or higher dimensions (e.g., 512, 1024). The use of the binary vector leads to significant speedup during the matching process in the search for near duplicates.

Further yet, although the present embodiments are described with reference to binary vectors, the same principles may be applied with non-binary vectors, such as vectors containing integers or real numbers.

At operation 510, the horizontal and vertical gradients are obtained as well as the frame index and video identifier (ID).

At operation 512, the keypoint description is generated by combining the keypoint representation, the horizontal gradient, the vertical gradient, a frame index, and the video ID. The addition of the frame index and video ID provides the identification of the video and frame embedded within the keypoint description for quick processing. In other example embodiments, the keypoint description may include subset of the parameters identified above or some parameters may be combined (e.g., vertical and horizontal gradients).

Figure 6:
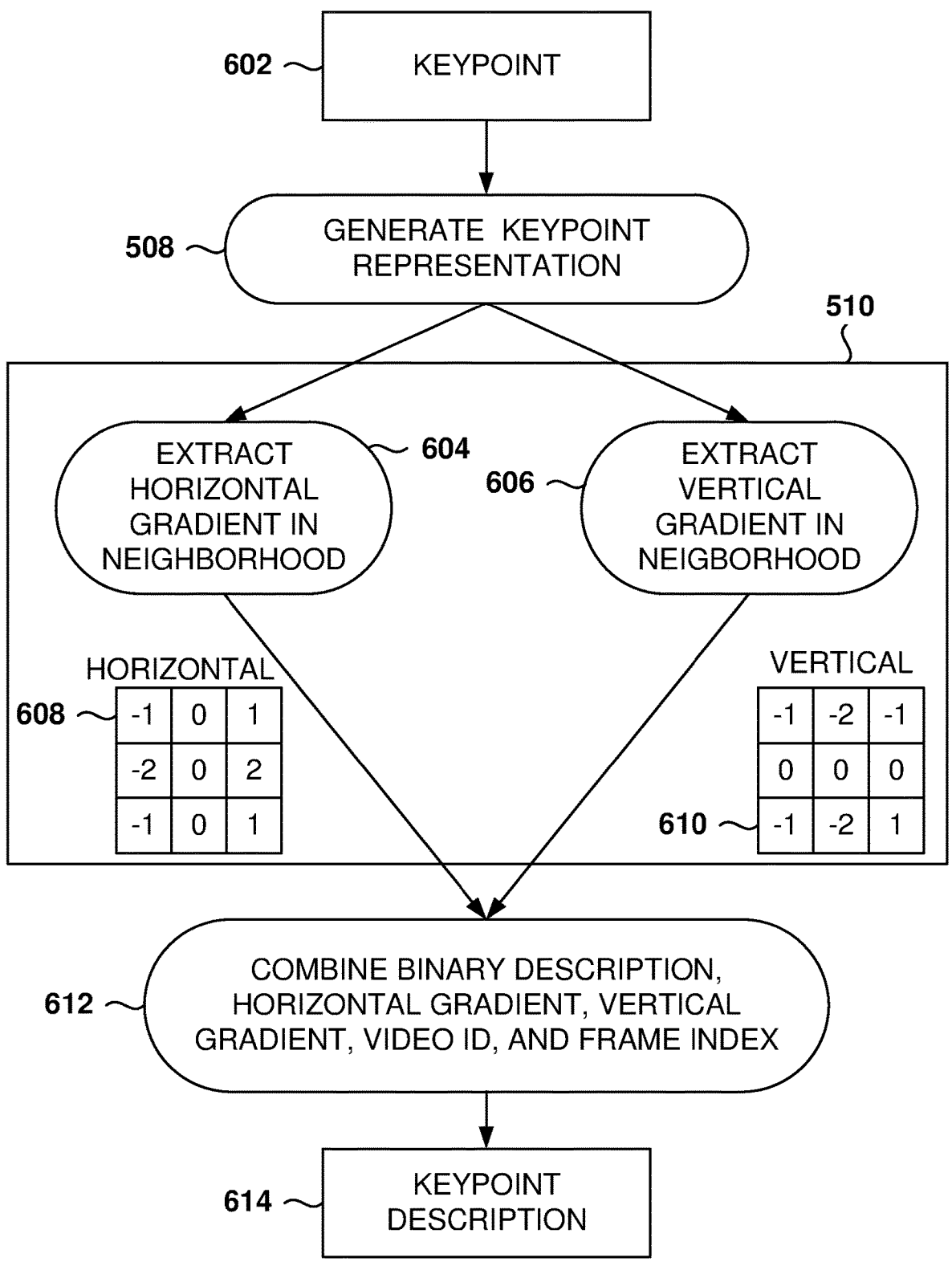
FIG. 6 illustrates the process for generating keypoint descriptions, according to some example embodiments.

FIG. 6 illustrates the process 514 for generating the keypoint description 614 for keypoint 602, according to some example embodiments. To make the keypoint description 614 robust, information about the horizontal gradient and vertical gradient is included in the keypoint description 614. By including the gradient information, the keypoint can still be compared to the same keypoint in frames that have been modified, such as changes of brightness, noise addition, etc.

A square region of size M×M (M is 3 in the illustrated example) is defined around the keypoint. In other example embodiments, M has other values, such as in the range from 3 to 25 or more.

At operation 604, the local horizontal gradient is extracted for the keypoint using a horizontal filter, which is a type of a convolutional operator. The horizontal filter 608 illustrated in FIG. 6 is an example of a 3×3 filter, but other types of filters and filters with different sizes may also be utilized.

Similarly, at operation 606, the vertical horizontal gradient is extracted for the keypoint using a vertical filter. The vertical filter 608 illustrated in FIG. 6 is an example of a 3×3 filter, but other types of filters and filters with different sizes may also be utilized. The values in the horizontal filter can vary depending on the size of the horizontal and vertical vector. In one example embodiment, when the size of the filter is 3×3, the horizontal and vertical filters can have the following values shown in Table 1 below:

TABLE 1

| Horizontal | | | Vertical | | |
|---|---|---|---|---|---|
| −1 | 0 | +1 | +1 | +2 | +1 |
| −2 | 0 | +2 | 0 | 0 | 0 |
| −1 | 0 | +1 | −1 | −2 | −1 |

To calculate the horizontal gradient, the horizontal filter 608 is applied to the keypoint and to calculate the vertical gradient, the vertical filter 610 is applied to the keypoint. For example, a keypoint has the following image values around the keypoint (the keypoint corresponds to the center of the matrix) shown in Table 2:

TABLE 2

| Image values | | |
|---|---|---|
| 10 | 1 | 100 |
| 8 | 2 | 110 |
| 15 | 3 | 107 |

To calculate the horizontal gradient and the vertical gradient, the corresponding filter is applied to the image values. The horizontal gradient is 386, calculated as $(10 \cdot (-1) + 1 \cdot 0 + 100 \cdot 1 + 8 \cdot (-2) + 2 \cdot 0 + 110 \cdot 2 + 15 \cdot (-1) + 3 \cdot 0 + 107 \cdot 1)$. The vertical gradient is −16, calculated as $(10 \cdot 1 + 1 \cdot 2 + 100 \cdot 1 + 8 \cdot 0 + 2 \cdot 0 + 110 \cdot 0 + 15 \cdot (-1) + 3 \cdot (-2) + 107 \cdot (-1))$.

In some example embodiments, once the gradients are calculated around the keypoint, the values within the matrix of gradients are converted to binary by comparing the gradient value to the gradient of the keypoint. If the gradient for a value in the matrix is greater than the keypoint gradient value, the value in the binary matrix is encoded as 1, otherwise if the value in the matrix is not greater (e.g., equal or less), the value in the binary matrix is encoded as 0.

An example for horizontal gradients is described below with reference to Table 3:

TABLE 3

| Horizontal Gradients | | | Binary conversion | | |
|---|---|---|---|---|---|
| 24 | 25 | 27 | 0 | 0 | 0 |
| 895 | 386 | 400 | 1 | 0 | 1 |
| 895 | 400 | 302 | 1 | 1 | 0 |

The matrix is then converted to a binary vector by concatenating the values in the rows (or in the columns). Thus, there are 9 binary values for the horizontal direction and 9 binary values for the vertical direction. Combining both binary vectors results in a binary vector with 18 values.

At operation 612, the keypoint description 614 is obtained by combining the binary description of the keypoint, the horizontal binary vector, the vertical binary vector, the video ID, and the frame index. In some example embodiments, these values are all binary and the combination includes concatenating all these binary values, but other embodiments may combine these values in other ways, such as concatenating the values in a different order. More details are provided in FIG. 7 below regarding the calculation of the keypoint description 614.

Having the frame index and the video ID in the keypoint description 614 is valuable because the method is for partial video copy detection, so once a match of keypoint in different videos is made, the frame index and the video ID are readily available. Once a match is made, the video ID of the match is known as well as the frame, or frames, that matched, which enables performing near duplicate matching as the frames do not have to be in the same sequence number from one video to another.

Regarding detection in the face of distortion, distortion may make the keypoints change the gradient or the keypoints may even disappear in the distortion is severe. In order to provide robustness against distortion, other methods compare keypoints across different kind of gradient thresholds.

With the present method, even if distortion changes gradients around the keypoint, if the distortion does not change the relative change of the gradients, it is possible to still detect with these keypoints since binary values (meaning greater than or equal) are being used.

Further, the present method is able to perform matches very quickly because of the use of binary vectors so it is possible to use this methodology in large online services the process a large amount of videos and have large video libraries.

Figure 7:
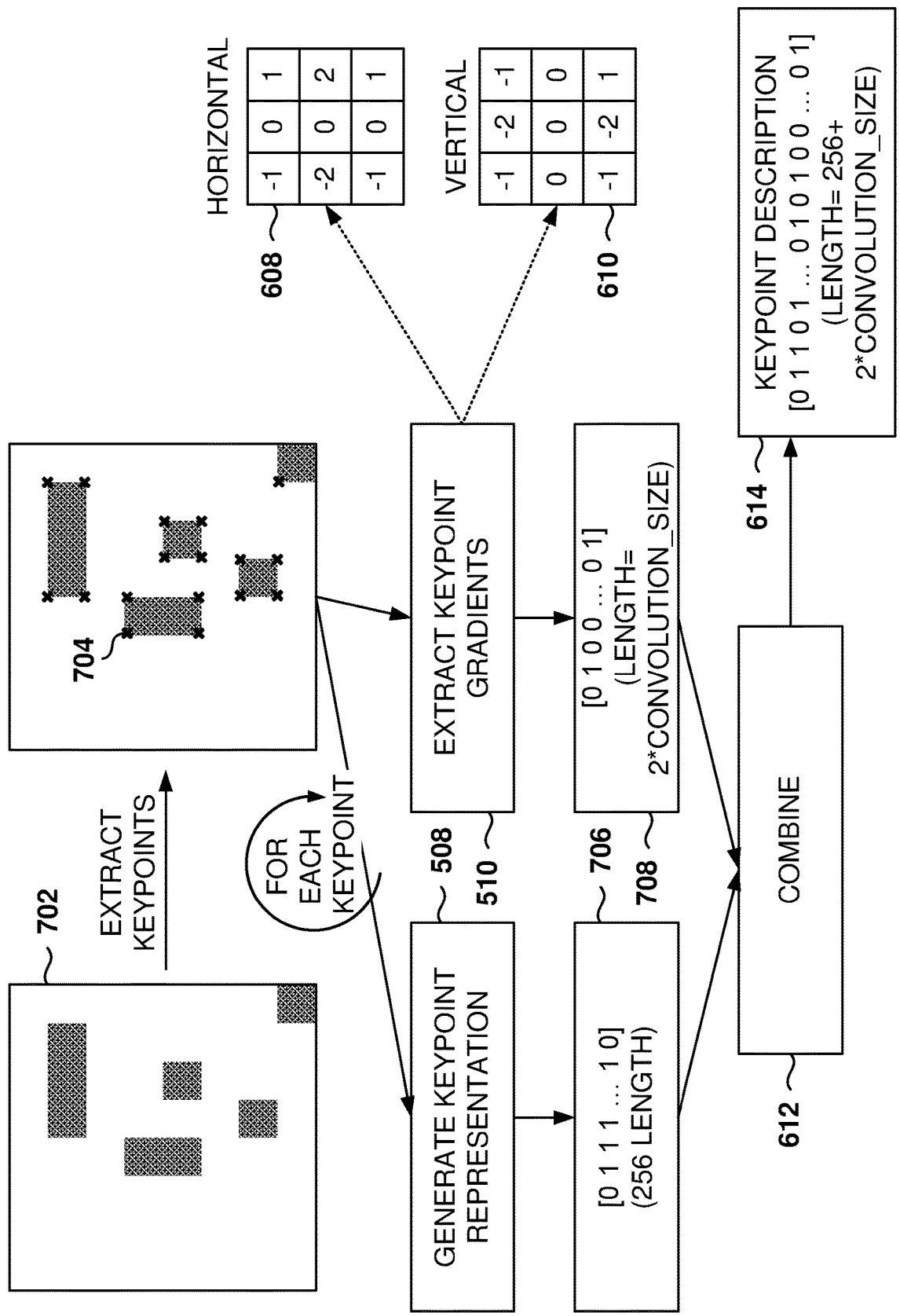
FIG. 7 provides details on the generation of the keypoint descriptors, according to some example embodiments.

FIG. 7 provides details on the generation of the keypoint descriptors, according to some example embodiments. Image 702 is submitted for creating the keypoint descriptions. The keypoints 704 are extracted. In some example embodiments, the keypoints are those points where the horizontal and vertical gradient indicate substantial change in the image along the horizontal and vertical directions. In this example, image 702 includes a plurality of rectangles and the keypoints 704 are found at the corners of the rectangles.

For each keypoint, the keypoint representation 706 is generated 508, as discussed above. In some example embodiments, the keypoint representation is a binary vector 256 bits long. Further, also for each keypoint the keypoint gradients are extracted at operation 510. As discussed above with reference to FIG. 6, extracting the gradients is performed, in one example embodiment, utilizing horizontal filter 608 and vertical filter 610.

The keypoint gradients are converted to binary at operation 708, resulting in a binary vector two times the size of the convolution function (e.g., horizontal and vertical filters), and in the case of a 3×3 filters, the completion size is nine for the nine values in the corresponding matrix.

At operation 612, the keypoint description 614 is calculated by combining the keypoint representation, the binary vectors from the gradients, the frame index, and the video ID. In some example embodiment, the keypoint description is a concatenation of these values as follows:

keypoint description=keypoint_representation|horizontal_ binary_gradient|vertical_binary gradient|frame_index|video_id In other example embodiments, the keypoint description 614 may be calculated by combining these values in a different order or by adding additional information. In some example embodiments, a subset of these values may be used as the keypoint representation, such as by meeting the frame index or combining the vertical and binary gradient.

In other example embodiments, a score for the keypoint may also be provided. Different keypoints in an image can have different amount of discriminatory power. For example, if a corner point has strong gradients, then the chances of the corner point surviving attack (e.g., alteration) is much greater than a keypoint with fainter gradients. Thus, a score is assigned to each keypoint and then the score added to the keypoint description. Further, some keypoints may be omitted from the database if their score is below a predetermined threshold.

During fingerprint matching (see FIG. 4), a particular video is analyzed to detect near duplicates. To match the features (operation 416) the binary vectors in the database are compared to the binary vectors of the submitted video. For example, an exclusive OR logical operation may be used to compare two keypoint descriptors (without the frame index and video ID since those values will be different).

The frame indices and video IDs of the matching are extracted and further processing may be used to determine if the video is a near duplicate. For example, by comparing the number of keypoints matched. A single keypoint match may not mean a video match, but 60% or more may mean a match. This threshold may vary according to the application.

In some example embodiments, the match function is formulated using the number of keypoints matched in the given video, the number of matched frames in the video, and number of continuous frame matches. In some example embodiment, a frame is considered to have been match when a percentage above a certain threshold of the keypoints are matched (e.g., 90%). In some example embodiments, the videos can be sorted based on the value of their match function for easier retrieval. An example matching function is as follows:

matching_function(video_id)=number of matched_keypoints+number of matched_frames+number of consecutive_matched_frames With this matching function, the matching algorithm returns a predetermine number K of top matches, where K is determined on a use case basis and is a configurable parameter. For example, K is in the range from 1 to 100, but higher values are also possible.

It is noted that this matching function is an example and does not describe every possible embodiment. Other embodiments may utilize different matching functions, such as by dividing the number of matched keypoints by the number of matched frames, multiplying the three parameters instead of adding them, weight each of the parameters with respective weights, etc. This matching function embodiments should therefore not be interpreted to be exclusive or limiting, but rather illustrative.

Figure 8:
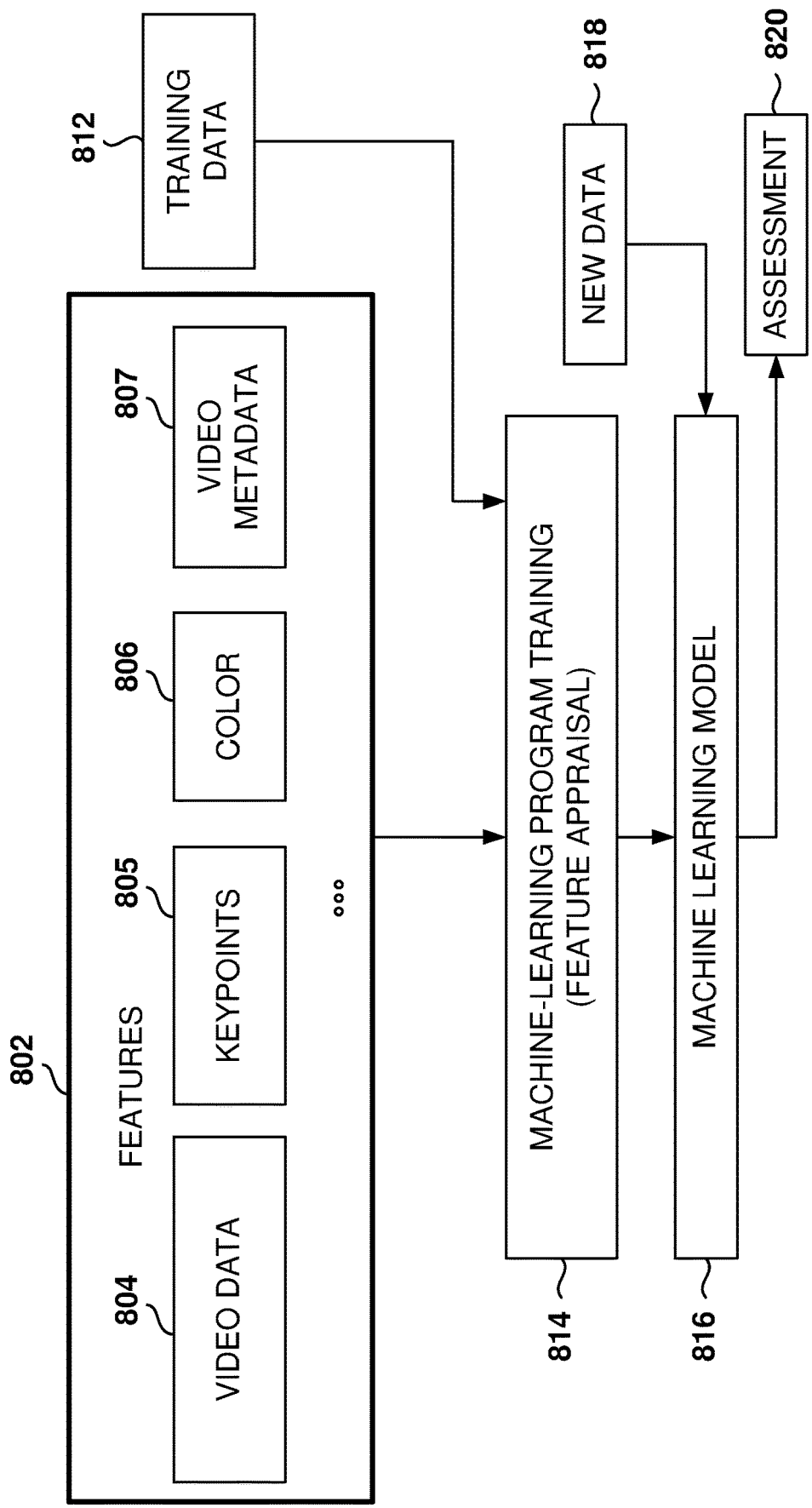
FIG. 8 illustrates the training and use of a machine-learning program, according to some example embodiments.

FIG. 8 illustrates the training and use of a machine-learning program, according to some example embodiments. In some example embodiments, machine-learning programs (MLPs), also referred to as machine-learning algorithms or tools, are utilized to perform operations associated with searches, such as video matching.

Machine Learning is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 816 from example training data 812 in order to make data-driven predictions or decisions expressed as outputs or assessments 820. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data. In some example embodiments, the data representation includes the keypoint descriptions 614 described above with reference to FIGS. 6 and 7.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, example ML models 816 a probability score for a plurality of videos, the probability score indicating the probability that the video matches the video being searched for near duplication. In some example embodiments, the ML model 816 is used to calculate probability scores for a subset of the videos in the library, where the subset is obtained based on the matching of the keypoint description. That is, the keypoint description is used to find candidates for near duplication, and the ML model 816 is used to obtain a probability score that there is a match.

The training data 812 comprises examples of values for the features 802. In some example embodiments, the training data comprises labeled data with examples of values for the features 802 and labels indicating the outcome, such as video ID of near duplicates. The machine-learning algorithms utilize the training data 812 to find correlations among identified features 802 that affect the outcome. A feature 802 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 802 may be of different types and may include one or more of video data 804, keypoint 805, color information 806, and video metadata.

During training 814, the ML algorithm analyzes the training data 812 based on identified features 802 and configuration parameters 811 defined for the training. The result of the training 814 is an ML model 816 that is capable of taking inputs to produce assessments.

Training an ML algorithm involves analyzing large amounts of data (e.g., from several gigabytes to a terabyte or more) in order to find data correlations. The ML algorithms utilize the training data 812 to find correlations among the identified features 802 that affect the outcome or assessment 820. In some example embodiments, the training data 812 includes labeled data, which is known data for one or more identified features 802 and one or more outcomes, such as the existence of a near duplicate.

The ML algorithms usually explore many possible functions and parameters before finding what the ML algorithms identify to be the best correlations within the data; therefore, training may require large amounts of computing resources and time.

When the ML model 816 is used to perform an assessment, new data 818 is provided as an input to the ML model 816, and the ML model 816 generates the assessment 820 as output. For example, when a video submitted by a user is checked for near duplicates, the ML model 816 determines if there one or more near duplicates. In some example embodiments, the ML model 816 also provides a probability score that the videos in the library are near duplicates of the submitted video.

Figure 9:
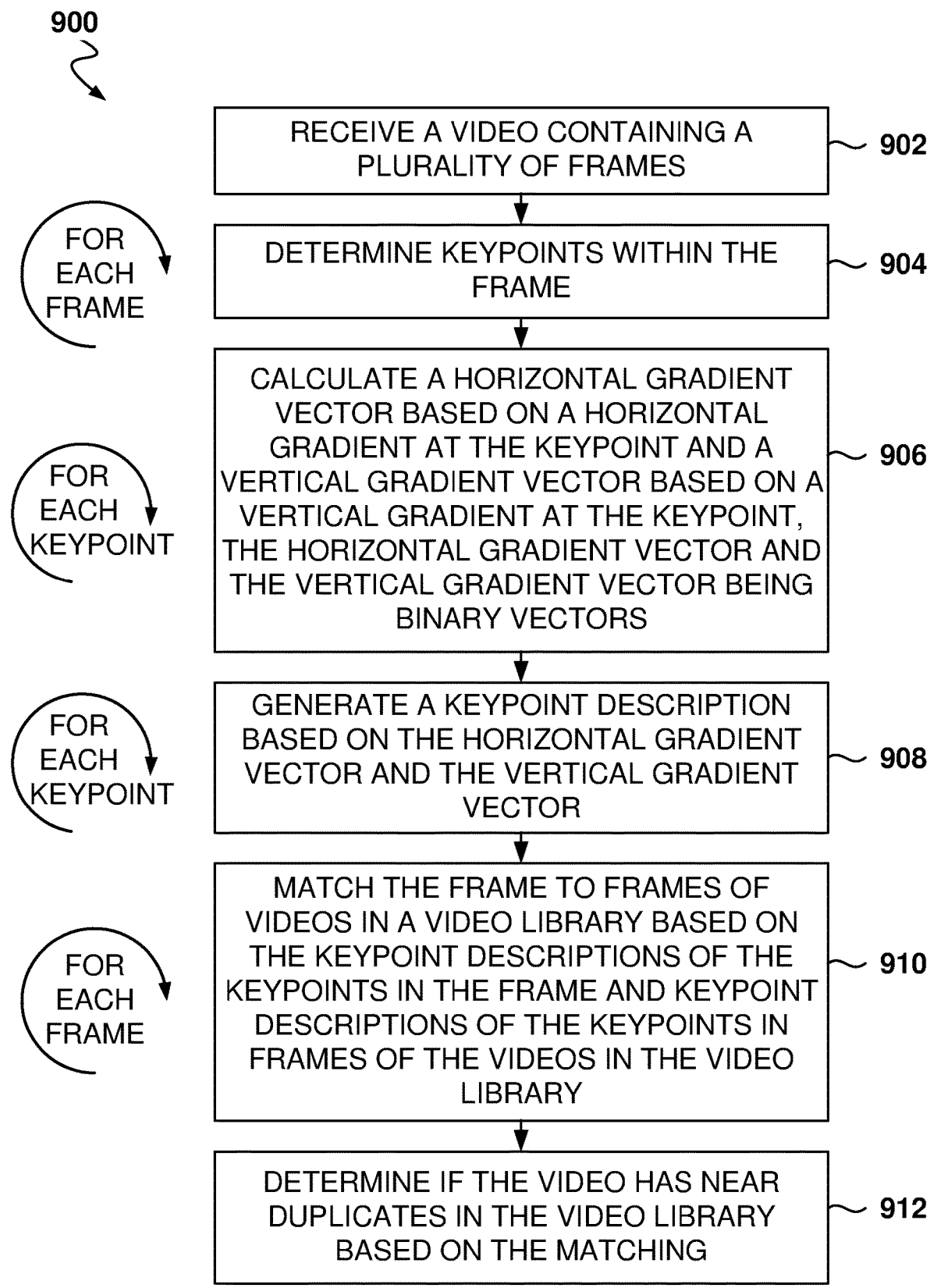
FIG. 9 is a flowchart of a method for detecting near duplicates and partial matches of videos, according to some example embodiments.

FIG. 9 is a flowchart of a method 900 for detecting near duplicates and partial matches of videos, according to some example embodiments. While the various operations in this flowchart are presented and described sequentially, one of ordinary skill will appreciate that some or all of the operations may be executed in a different order, be combined or omitted, or be executed in parallel.

At operation 902, one or more processors receive a video containing a plurality of frames. From operation 902, the method flows to operation 904 where the keypoints within the frames are calculated for each of the frames.

From operation 904, the method 900 flows to operation 906 where, for each keypoint, the one or more processors calculate a horizontal gradient vector based on a horizontal gradient at the keypoint and a vertical gradient vector based on a vertical gradient at the keypoint. The horizontal gradient vector and the vertical gradient vector are binary vectors.

From operation 906, the method 900 flows to operation 908, where the one or more processors generate, for each keypoint, a keypoint description based on the horizontal gradient vector and the vertical gradient vector.

Further, from operation 908, the method 900 flows to operation 910 where the one or more processors match, for each frame, the frame to frames of videos in a video library based on the keypoint descriptions of the keypoints in the frame and based on keypoint descriptions of the keypoints in frames of the videos in the video library.

From operation 910, the method 900 flows to operation 912 for determining, by the one or more processors, if the video has near duplicates in the video library based on the matching.

In one example, calculating the horizontal gradient vector and the vertical gradient vector further comprises identifying a matrix of points centered on the keypoint, calculating the horizontal gradient and the vertical gradient for the matrix of points to generate a horizontal matrix of gradients and a vertical matrix of gradients, and converting the horizontal matrix of gradients to obtain the horizontal gradient vector and the vertical matrix of gradients to obtain the vertical gradient vector.

In one example, calculating the horizontal gradient for the keypoint further comprises applying a horizontal matrix filter to the matrix of points by multiplying each value in the matrix of points by a respective value in the horizontal matrix filter, and adding results from the multiplications to obtain the horizontal gradient for the keypoint.

In one example, converting the horizontal matrix of gradients to obtain the horizontal gradient vector further comprises encoding each value in the horizontal matrix of gradients as a binary value, wherein a value that is encoded as 0 unless the value is greater than the horizontal gradient of the keypoint, and converting the encoded values to a vector.

In one example, generating the keypoint description further comprises concatenating a representation of the keypoint, the horizontal gradient vector, the vertical gradient vector, an index of the frame, and an identifier of the video to obtain the keypoint description.

In one example, matching the frame to frames of videos in the video library further comprises comparing at least a part of the keypoint description to keypoint descriptions of videos in the video library, and determining if a match is found based on the comparison.

In one example, matching the frame to frames of videos in the video library further comprises calculating a number of matched keypoints, a number of matched frames, and a number of consecutive matched frames; and determining if the video in the video library is a near duplicate based on the number of matched keypoints, the number of matched frames, and the number of consecutive matched frames.

In one example, matching the frame to frames of videos in the video library further comprises calculating, for one or more videos in the video library, a score indicating a probability that the video is a near duplicate.

In one example, matching the frame to frames of videos in the video library further comprises utilizing a machine-learning model to calculate a score indicating a probability that a video in the video library is a near duplicate.

In one example, the keypoint is a point in the video that has a horizontal gradient change greater than a first threshold when compared to neighbor points of the keypoints and has a vertical gradient change greater than a second threshold when compared to the neighbor points of the keypoints.

Another general aspect is for a system that includes a memory comprising instructions and one or more computer processors. The instructions, when executed by the one or more computer processors, cause the one or more computer processors to perform operations comprising: receiving a video containing a plurality of frames; for each frame, determining keypoints within the frame; for each keypoint, calculating a horizontal gradient vector based on a horizontal gradient at the keypoint and a vertical gradient vector based on a vertical gradient at the keypoint, the horizontal gradient vector and the vertical gradient vector being binary vectors; for each keypoint, generating a keypoint description based on the horizontal gradient vector and the vertical gradient vector; for each frame, matching the frame to frames of videos in a video library based on the keypoint descriptions of the keypoints in the frame and keypoint descriptions of the keypoints in frames of the videos in the video library; and determining if the video has near duplicates in the video library based on the matching.

In yet another general aspect, a machine-readable storage medium (e.g., a non-transitory storage medium) includes instructions that, when executed by a machine, cause the machine to perform operations comprising: receiving a video containing a plurality of frames; for each frame, determining keypoints within the frame; for each keypoint, calculating a horizontal gradient vector based on a horizontal gradient at the keypoint and a vertical gradient vector based on a vertical gradient at the keypoint, the horizontal gradient vector and the vertical gradient vector being binary vectors; for each keypoint, generating a keypoint description based on the horizontal gradient vector and the vertical gradient vector; for each frame, matching the frame to frames of videos in a video library based on the keypoint descriptions of the keypoints in the frame and keypoint descriptions of the keypoints in frames of the videos in the video library; and determining if the video has near duplicates in the video library based on the matching.

It is noted that the advantages of the keypoint description include: 1) fingerprinting of a video frame is easy to compute; b) ease of computation leads to scalability and its application over internet sized video datasets; c) the fingerprinting scheme is robust against common distortion attacks such as blurring, noise addition, and compression level changes; d) since the fingerprint for each keypoint is binary, matching procedures developed around are extremely fast and scalable.

It is noted that the presented embodiments provide the following advantages: 1) A novel method for video fingerprinting that is robust against heavy distortion; 2) the fingerprinting method can be used to detect near duplicates of given video among a collection of seed videos; 3) the method can also be used for tasks like video retrieval and video search; and 4) the method is scalable to work with large datasets and in presence of severe distortions in given video.

Figure 10:
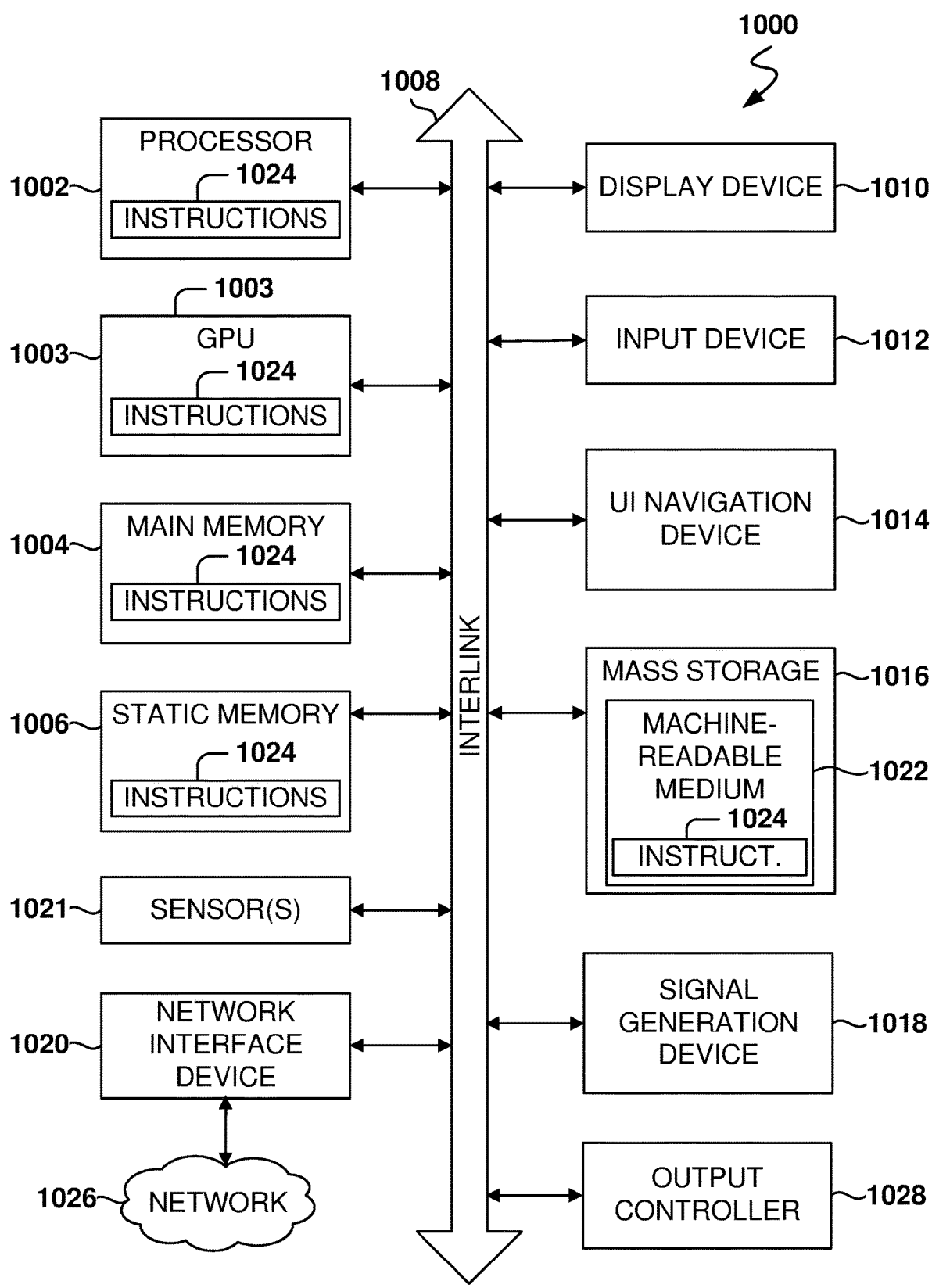
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by one or more processors, a video containing a plurality of frames;
    for each frame, determining keypoints within the frame;
    for each keypoint, calculating, by the one or more processors, a horizontal gradient vector based on a horizontal gradient at the keypoint and a vertical gradient vector based on a vertical gradient at the keypoint, the horizontal gradient vector and the vertical gradient vector being binary vectors;
    for each keypoint, generating, by the one or more processors, a keypoint description based on the horizontal gradient vector and the vertical gradient vector;
    for each frame, matching, by the one or more processors, the frame to frames of videos in a video library based on the keypoint descriptions of the keypoints in the frame and keypoint descriptions of the keypoints in frames of the videos in the video library; and
    determining, by the one or more processors, if the video has near duplicates in the video library based on the matching.

2. The method as recited in claim 1, wherein calculating the horizontal gradient vector and the vertical gradient vector further comprises:
    identifying a matrix of points centered on the keypoint;
    calculating the horizontal gradient and the vertical gradient for the matrix of points to generate a horizontal matrix of gradients and a vertical matrix of gradients; and
    converting the horizontal matrix of gradients to obtain the horizontal gradient vector and the vertical matrix of gradients to obtain the vertical gradient vector.

3. The method as recited in claim 2, wherein calculating the horizontal gradient for the keypoint further comprises:
    applying a horizontal matrix filter to the matrix of points by multiplying each value in the matrix of points by a respective value in the horizontal matrix filter; and
    adding results from the multiplications to obtain the horizontal gradient for the keypoint.

4. The method as recited in claim 3, wherein converting the horizontal matrix of gradients to obtain the horizontal gradient vector further comprises:
    encoding each value in the horizontal matrix of gradients as a binary value, wherein a value that is encoded as 0 unless the value is greater than the horizontal gradient of the keypoint; and
    converting the encoded values to a vector.

5. The method as recited in claim 1, wherein generating the keypoint description further comprises:
    concatenating a representation of the keypoint, the horizontal gradient vector, the vertical gradient vector, an index of the frame, and an identifier of the video to obtain the keypoint description.

6. The method as recited in claim 1, wherein matching the frame to frames of videos in the video library further comprises:
    comparing at least a part of the keypoint description to keypoint descriptions of videos in the video library; and
    determining if a match is found based on the comparison.

7. The method as recited in claim 6, wherein matching the frame to frames of videos in the video library further comprises:
    calculating a number of matched keypoints, a number of matched frames, and a number of consecutive matched frames; and
    determining if the video in the video library is a near duplicate based on the number of matched keypoints, the number of matched frames, and the number of consecutive matched frames.

8. The method as recited in claim 1, wherein matching the frame to frames of videos in the video library further comprises:
    calculating, for one or more videos in the video library, a score indicating a probability that the video is a near duplicate.

9. The method as recited in claim 1, wherein matching the frame to frames of videos in the video library further comprises:
    utilizing a machine-learning model to calculate a score indicating a probability that a video in the video library is a near duplicate.

10. The method as recited in claim 1, wherein the keypoint is a point in the video that has a horizontal gradient change greater than a first threshold when compared to neighbor points of the keypoints and has a vertical gradient change greater than a second threshold when compared to the neighbor points of the keypoints.

11. A system comprising:
    a memory comprising instructions; and
    one or more computer processors, wherein the instructions, when executed by the one or more computer processors, cause the system to perform operations comprising:
        receiving a video containing a plurality of frames;
        for each frame, determining keypoints within the frame;
        for each keypoint, calculating a horizontal gradient vector based on a horizontal gradient at the keypoint and a vertical gradient vector based on a vertical gradient at the keypoint, the horizontal gradient vector and the vertical gradient vector being binary vectors;
        for each keypoint, generating a keypoint description based on the horizontal gradient vector and the vertical gradient vector;

for each frame, matching the frame to frames of videos in a video library based on the keypoint descriptions of the keypoints in the frame and keypoint descriptions of the keypoints in frames of the videos in the video library; and determining if the video has near duplicates in the video library based on the matching.

12. The system as recited in claim 11, wherein calculating the horizontal gradient vector and the vertical gradient vector further comprises:

identifying a matrix of points centered on the keypoint;

calculating the horizontal gradient and the vertical gradient for the matrix of points to generate a horizontal matrix of gradients and a vertical matrix of gradients; and converting the horizontal matrix of gradients to obtain the horizontal gradient vector and the vertical matrix of gradients to obtain the vertical gradient vector.

13. The system as recited in claim 12, wherein calculating the horizontal gradient for the keypoint further comprises:

applying a horizontal matrix filter to the matrix of points by multiplying each value in the matrix of points by a respective value in the horizontal matrix filter; and adding results from the multiplications to obtain the horizontal gradient for the keypoint.

14. The system as recited in claim 13, wherein converting the horizontal matrix of gradients to obtain the horizontal gradient vector further comprises:

encoding each value in the horizontal matrix of gradients as a binary value, wherein a value that is encoded as 0 unless the value is greater than the horizontal gradient of the keypoint; and converting the encoded values to a vector.

15. The system as recited in claim 11, wherein generating the keypoint description further comprises:

concatenating a representation of the keypoint, the horizontal gradient vector, the vertical gradient vector, an index of the frame, and an identifier of the video to obtain the keypoint description.

16. A non-transitory machine-readable storage medium including instructions that, when executed by a machine, cause the machine to perform operations comprising:

receiving a video containing a plurality of frames;

for each frame, determining keypoints within the frame;

for each keypoint, calculating a horizontal gradient vector based on a horizontal gradient at the keypoint and a vertical gradient vector based on a vertical gradient at the keypoint, the horizontal gradient vector and the vertical gradient vector being binary vectors;

for each keypoint, generating a keypoint description based on the horizontal gradient vector and the vertical gradient vector;

for each frame, matching the frame to frames of videos in a video library based on the keypoint descriptions of the keypoints in the frame and keypoint descriptions of the keypoints in frames of the videos in the video library; and determining if the video has near duplicates in the video library based on the matching.

17. The non-transitory machine-readable storage medium as recited in claim 16, wherein calculating the horizontal gradient vector and the vertical gradient vector further comprises:

identifying a matrix of points centered on the keypoint;

calculating the horizontal gradient and the vertical gradient for the matrix of points to generate a horizontal matrix of gradients and a vertical matrix of gradients; and converting the horizontal matrix of gradients to obtain the horizontal gradient vector and the vertical matrix of gradients to obtain the vertical gradient vector.

18. The non-transitory machine-readable storage medium as recited in claim 17, wherein calculating the horizontal gradient for the keypoint further comprises:

applying a horizontal matrix filter to the matrix of points by multiplying each value in the matrix of points by a respective value in the horizontal matrix filter; and adding results from the multiplications to obtain the horizontal gradient for the keypoint.

19. The non-transitory machine-readable storage medium as recited in claim 18, wherein converting the horizontal matrix of gradients to obtain the horizontal gradient vector further comprises:

encoding each value in the horizontal matrix of gradients as a binary value, wherein a value that is encoded as 0 unless the value is greater than the horizontal gradient of the keypoint; and converting the encoded values to a vector.

20. The non-transitory machine-readable storage medium as recited in claim 16, wherein generating the keypoint description further comprises:

concatenating a representation of the keypoint, the horizontal gradient vector, the vertical gradient vector, an index of the frame, and an identifier of the video to obtain the keypoint description.

* * * * *